(12) United States Patent
Toya

(10) Patent No.: US 11,773,264 B2
(45) Date of Patent: Oct. 3, 2023

(54) SILICONE COMPOSITION

(71) Applicant: SHIN-ETSU CHEMICAL CO., LTD., Tokyo (JP)

(72) Inventor: Wataru Toya, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 631 days.

(21) Appl. No.: 17/040,156

(22) PCT Filed: Mar. 14, 2019

(86) PCT No.: PCT/JP2019/010477
§ 371 (c)(1),
(2) Date: Sep. 22, 2020

(87) PCT Pub. No.: WO2019/181713
PCT Pub. Date: Sep. 26, 2019

(65) Prior Publication Data
US 2021/0115252 A1  Apr. 22, 2021

(30) Foreign Application Priority Data
Mar. 23, 2018  (JP) ................ 2018-056869

(51) Int. Cl.
C08L 83/06 (2006.01)

(52) U.S. Cl.
CPC ......... C08L 83/06 (2013.01); *C08L 2205/025* (2013.01); *C08L 2205/035* (2013.01)

(58) Field of Classification Search
CPC .................................................. C08L 83/06
USPC ....................................................... 524/496
See application file for complete search history.

(56) References Cited

U.S. PATENT DOCUMENTS

| | | | |
|---|---|---|---|
| 7,786,056 B2 | 8/2010 | Matsumoto et al. | |
| 9,177,467 B2 | 11/2015 | Tu | |
| 2002/0018885 A1 | 2/2002 | Takahashi et al. | |
| 2003/0049466 A1 | 3/2003 | Yamada et al. | |
| 2007/0149834 A1 | 6/2007 | Endo et al. | |
| 2010/0006798 A1* | 1/2010 | Endo ............... | C09K 5/14 252/78.3 |
| 2011/0024675 A1 | 2/2011 | Endo et al. | |
| 2012/0119137 A1 | 5/2012 | Tsuji et al. | |
| 2015/0176930 A1 | 6/2015 | Zhao et al. | |
| 2016/0068732 A1* | 3/2016 | Kitazawa ......... | C08L 83/00 252/75 |

FOREIGN PATENT DOCUMENTS

| CN | 101294066 A | 10/2008 |
|---|---|---|
| CN | 103740110 A | 4/2014 |
| JP | 2938428 B1 | 8/1999 |
| JP | 2938429 B1 | 8/1999 |
| JP | 3580366 B2 | 10/2004 |
| JP | 3891969 B2 | 3/2007 |
| JP | 3948642 B2 | 7/2007 |
| JP | 3952184 B2 | 8/2007 |
| JP | 3957596 B2 | 8/2007 |
| JP | 2008-260798 A | 10/2008 |
| JP | 2009-209165 A | 9/2009 |
| JP | 2010-150399 A | 7/2010 |
| JP | 4572243 B2 | 11/2010 |
| JP | 4656340 B2 | 3/2011 |
| JP | 4913874 B2 | 4/2012 |
| JP | 4917380 B2 | 4/2012 |
| JP | 2012-96361 A | 5/2012 |
| JP | 2012-102283 A | 5/2012 |
| JP | 4933094 B2 | 5/2012 |
| JP | 2013-538494 A | 10/2013 |

(Continued)

OTHER PUBLICATIONS

International Search Report (PCT/ISA/210) issued in PCT/JP2019/010477 dated Jun. 18, 2019.
Written Opinion (PCT/ISA/237) issued in PCT/JP2019/010477 dated Jun. 18, 2019.
Chinese Office Action and Search Report for Chinese Application No. 201980021008.7, dated Apr. 20, 2022.

*Primary Examiner* — Deve V Hall

(74) *Attorney, Agent, or Firm* — Birch, Stewart, Kolasch & Birch, LLP

(57) ABSTRACT

This silicone composition contains
(A) an organopolysiloxane which has at least two aliphatic unsaturated hydrocarbon groups per molecule and has a kinematic viscosity at 25° C. of 60-100,000 mm²/s,
(B) an organohydrogenpolysiloxane represented by general formula (I)

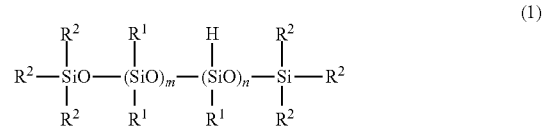

(1)

($R^1$ is an alkyl group having 1-6 carbon atoms, $R^2$ is $R^1$ or a hydrogen atom, n is an integer between 2 and 40, m is an integer between 0 and 98, and the value of n+m is such that 5≤n+m≤100),
(C) a flaky graphite powder having an average thickness of 100 nm or less,
(D) a thermally conductive filler having a thermal conductivity of 10 W/m·° C. or more,
(E) a platinum group metal catalyst and
(G) a slightly volatile isoparaffin compound which has a boiling point of 160-360° C. and which can disperse or dissolve the component (A) and the component (B). This silicone composition can give a silicone grease having a higher thermal conductivity and better handleability than conventional silicone greases.

6 Claims, No Drawings

(56) References Cited

FOREIGN PATENT DOCUMENTS

| WO | WO 2016/038836 A1 | 3/2016 |
| WO | WO 2016/190258 A1 | 12/2016 |
| WO | WO 2017/208341 A1 | 12/2017 |

\* cited by examiner

SILICONE COMPOSITION

TECHNICAL FIELD

The present invention relates to a silicone composition. More specifically, the invention relates to a silicone composition which, although it contains a large amount of heat-conductive filler, is capable of serving as a silicone grease that has a good handleability and provides an excellent thermal performance after setting.

BACKGROUND ART

It is widely known that semiconductor devices generate heat during use and undergo a decline in performance as a result. Various heat-dissipating techniques are used as means for resolving this problem. Generally, heat dissipation is carried out by placing a cooling member (a heat sink or the like) near a heat-generating member and, with both set in close contact, efficiently removing heat from the cooling member. At this time, if there is a gap between the heat-generating member and the cooling member, the thermal conductivity decreases due to the presence therebetween of air, which has a poor ability to conduct heat, and so the temperature of the heat-generating member fails to decline to a sufficient degree. In order to prevent this from happening, use is made of a heat-dissipating material that has a good thermal conductivity and the ability to conform to the surfaces of the members, such as a heat-dissipating grease or a heat-dissipating sheet (Patent Documents 1 to 13: JP No. 2938428. JP No. 2938429, JP No. 3580366, JP No. 3952184, JP No. 4572243. JP No. 4656340, JP No. 4913874, JP No. 4917380. JP No. 4933094, JP-A 2008-260798, JP-A 2009-209165, JP-A 2012-102283, JP-A 2012-96361).

In recent years, sophisticated semiconductor devices such as server CPUs have seen an increase in the amount of heat generated during operation. With such an increase in the amount of generated heat, the heat-dissipating performance required of heat-dissipating greases and heat-dissipating sheets also is being enhanced. Enhancing the heat-dissipating performance means to either decrease the thermal resistance or increase the thermal conductivity of the heat-dissipating grease or heat-dissipating sheet. However, in the prior art, when the loading of a heat-conductive filler is raised in order to increase the thermal conductivity, the viscosity of the composition ends up rising and discharge becomes difficult. In order to resolve such a problem, various types of heat-conductive fillers and combinations thereof have hitherto been investigated, but these have not been adequate from the standpoint of the thermal conductivity (Patent Documents 14 to 16: JP Nos. 3891969, U.S. Pat. Nos. 3,957,596 and 3,948,642).

PRIOR ART DOCUMENTS

Patent Documents

Patent Document 1: JP No. 2938428
Patent Document 2: JP No. 2938429
Patent Document 3: JP No. 3580366
Patent Document 4: JP No. 3952184
Patent Document 5: JP No. 4572243
Patent Document 6: JP No. 4656340
Patent Document 7: JP No. 4913874
Patent Document 8: JP No. 4917380
Patent Document 9: JP No. 4933094
Patent Document 10: JP-A 2008-260798
Patent Document 11: JP-A 2009-209165
Patent Document 12: JP-A 2012-102283
Patent Document 13: JP-A 2012-96361
Patent Document 14: JP No. 3891969
Patent Document 15: JP No. 3957596
Patent Document 16: JP No. 3948642

SUMMARY OF INVENTION

Technical Problem

As mentioned above, the amount of heat generated during operation in sophisticated semiconductor devices has been increasing in recent years, and so there exists a desire for the development of silicone greases which have a high thermal conductivity and sufficient flowability.

It is therefore an object of the present invention to provide a silicone composition which is capable of giving a silicone grease that, compared with conventional silicone greases, has a high thermal conductivity and a good handleability.

Solution to Problem

The inventor has conducted extensive investigations in order to achieve this object and, as a result, has discovered that a silicone composition which contains (A) an organopolysiloxane having at least two aliphatic unsaturated hydrocarbon groups per molecule and a kinematic viscosity at 25° C. of from 60 to 100,000 mm²/s, (B) an organohydrogenpolysiloxane of subsequently described general formula (1), (C) a flaked graphite powder having an average thickness of 100 m or less. (D) a heat-conductive filler having a thermal conductivity of at least 10 W/m·° C., (E) a platinum group metal catalyst and (G) a slightly volatile isoparaffin compound having a boiling point of between 160° C. and 360° C. that can disperse or dissolve components (A) and (B) is capable of serving as a silicone grease having a good flowability even though it contains a large amount of heat-conductive filler. This discovery ultimately led to the present invention.

Accordingly, the invention provides the following silicone composition.

1.

A silicone composition which includes:

(A) 100 parts by weight of an organopolysiloxane having at least two aliphatic unsaturated hydrocarbon groups per molecule and a kinematic viscosity at 25° C. of from 60 to 100,000 mm²/s, (B) an organohydrogenpolysiloxane of general formula (1) below in an amount corresponding to 0.5 to 3 moles of silicon-bonded hydrogen atoms per mole of silicon-bonded alkenyl groups in the composition

[Chem. 1]

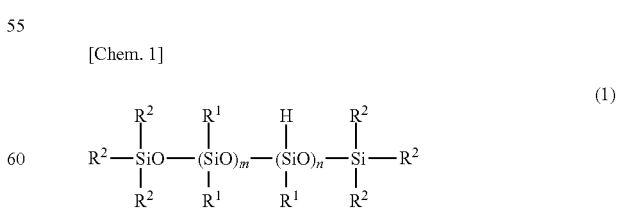

(wherein each $R^1$ is independently an alkyl group of 1 to 6 carbon atoms, each $R^2$ is independently $R^1$ or a hydrogen atom, n is an integer from 2 to 40, m is an integer from 0 to 98, and n+m satisfies the condition $5 \leq n+m \leq 100$).

(C) from 1 to 50 parts by weight of flaked graphite powder having an average thickness of 100 nm or less, (D) from 100 to 4,000 parts by weight of a heat-conductive filler having a thermal conductivity of at least 10 W/m·°C., (E) an effective amount of a platinum group metal catalyst, and (G) from 0.1 to 20 wt %, based on the overall silicone composition, of a slightly volatile isoparaffin compound having a boiling point of between 160° C. and 360° C. that can disperse or dissolve components (A) and (B).

2.

The silicone composition of 1 above, further including (F) a reaction regulator in an amount of from 0.05 to 5 parts by weight per 100 parts by weight of component (A).

3.

The silicone composition of 1 or 2 above, further including (H) a hydrolyzable alkylpolysiloxane of general formula (2) below

[Chem. 2]

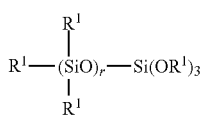

(2)

(wherein each $R^1$ is independently an alkyl group of 1 to 6 carbon atoms, and r is an integer from 5 to 100), in an amount of from 1 to 400 parts by weight per 100 parts by weight of component (A).

4.

The silicone composition of any of 1 to 3 above, further including (I) a hydrolyzable organopolysiloxane of general formula (3) below

[Chem. 3]

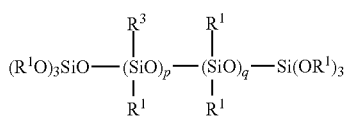

(3)

(wherein each $R^1$ is independently an alkyl group of 1 to 6 carbon atoms, each $R^3$ is independently an alkenyl group of 2 to 6 carbon atoms, p is an integer from 1 to 20, q is an integer from 0 to 99, and p+q satisfies the condition $5 \leq p+q \leq 100$), in an amount of from 1 to 50 parts by weight per 100 parts of component (A).

5.

The silicone composition of any of 1 to 4 above, further including (J) an organohydrogenpolysiloxane having at least one functional group selected from epoxy, (meth)acryloyl, (meth)acryloxy, alkoxysilyl, ether and carbonyl groups per molecule, in an amount corresponding to from 0.5 to 3 moles of silicon-bonded hydrogen atoms per mole of silicon-bonded alkenyl groups in the composition.

6.

The silicone composition of any of 1 to 5 above, further including (K) an organic peroxide having a ten hour half-life temperature of at least 40° C., in an amount of from 0.01 to 10 parts by weight per 100 parts by weight of component (A).

Advantageous Effects of Invention

The silicone composition of the invention is able to have a good flowability even though it contains a large amount of heat-conductive filler, and thus can serve as a silicone grease having a high thermal conductivity and good handleability.

DESCRIPTION OF EMBODIMENTS

The invention is described in detail below.

Component (A)

Component (A) is an organopolysiloxane which has at least 2, preferably from 2 to 40, aliphatic unsaturated hydrocarbon groups per molecule and a kinematic viscosity at 25° C. of from 60 to 100,000 mm$^2$/s.

The aliphatic unsaturated hydrocarbon groups are monovalent hydrocarbon groups of preferably 2 to 8 carbon atoms, more preferably from 2 to 6 carbon atoms, having an aliphatic unsaturated bond, and are even more preferably alkenyl groups of 2 to 8 carbon atoms, especially 2 to 6 carbon atoms. Illustrative examples include alkenyl groups such as vinyl, allyl, propenyl, isopropenyl, butenyl, hexenyl, cyclohexyl and octenyl groups. Vinyl groups are especially preferred.

The aliphatic unsaturated hydrocarbon groups may be bonded either to silicon atoms at the ends of the molecular chain or to silicon atoms partway along the molecular chain, or may be bonded to both.

The organopolysiloxane has a kinematic viscosity at 25° C. of from 60 to 100,000 mm$^2$/s, and preferably from 100 to 30,000 mm$^2$/s. At a dynamic viscosity below 60 mm$^2$/s, the physical properties of the silicone composition decrease; at a dynamic viscosity greater than 100,000 mm$^2$/s, the silicone composition has a poor extensibility.

In this invention, the kinematic viscosity is a value measured at 25° C. with an Ubbelohde-type Ostwald viscometer.

Organic groups other than aliphatic unsaturated hydrocarbon groups that are bonded to the silicon atoms on the organopolysiloxane are unsubstituted or substituted monovalent hydrocarbon groups of 1 to 18 carbon atoms, preferably 1 to 10 carbon atoms, and more preferably 1 to 8 carbon atoms, which do not have an aliphatic unsaturated bond. Examples include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; and groups in which some or all hydrogen atoms on these groups are substituted with halogen atoms such as fluorine, bromine or chlorine, cyano groups or the like, examples of which include chloromethyl, chloropropyl, bromoethyl, trifluoropropyl and cyanoethyl groups. Of these, methyl groups are especially preferred.

The organopolysiloxane, so long as it possesses the above properties, has a molecular structure which is not particularly limited and may be, for example, linear, branched, partially branched, or linear with cyclic structures. Of these, a linear structure in which the backbone consists of repeating diorganosiloxane units and both ends of the molecular chain are capped with triorganosioxy groups is preferred. Organopolysiloxanes with this linear structure may have branched structures or cyclic structures in some places.

The organopolysiloxane may be of one type used alone or two or more types may be used in combination.

The organopolysiloxane serving as component (A) is exemplified by those having the following average compositional formula (4) below

(wherein R is a monovalent hydrocarbon group of 2 to 8 carbon atoms which has an aliphatic unsaturated bond, R' is an unsubstituted or substituted monovalent hydrocarbon group of 1 to 18 carbon atoms which does not have an aliphatic unsaturated bond, the subscript "a" is a positive number from 0.0001 to 0.2, the subscript "b" is a positive number from 0.7 to 2.2, and a+b is a positive number from 0.8 to 2.3).

In Formula (4), R is a monovalent hydrocarbon group of 2 to 8 carbon atoms which has an aliphatic unsaturated bond, and is exemplified in the same way as the above-described aliphatic unsaturated hydrocarbon groups.

R' is an unsubstituted or substituted monovalent hydrocarbon group of 1 to 18 carbon atoms which does not have an aliphatic unsaturated bond, and is exemplified in the same way as the above-described organic groups other than aliphatic unsaturated hydrocarbon groups.

The subscript "a" is a positive number from 0.0001 to 0.2, preferably a positive number from 0.0005 to 0.1, and more preferably a positive number from 0.01 to 0.05. The subscript "b" is a positive number from 0.7 to 2.2, preferably a positive number from 1.8 to 2.1, and more preferably a positive number from 1.95 to 2.0. The sum a+b is a positive number from 0.8 to 2.3, preferably a positive number from 1.9 to 2.2, and more preferably a positive number from 1.98 to 2.05.

Component (B)

Component (B) is an organohydrogenpolysiloxane of general formula (1) below. In the presence of the subsequently described platinum group metal catalyst, silicon-bonded hydrogen atoms (SiH groups) on the organohydrogenpolysiloxane molecule undergo addition reactions with aliphatic unsaturated hydrocarbon groups in the composition, forming a crosslinked structure.

[Chem. 4]

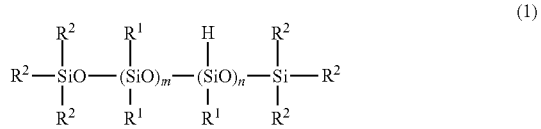

In formula (1), each $R^1$ is independently an alkyl group of 1 to 6 carbon atoms, each $R^2$ is independently $R^1$ or a hydrogen atom, n is an integer from 2 to 40, m is an integer from 0 to 98, and n+m satisfies the condition $5 \leq n+m \leq 100$.

In formula (1), each $R^1$ is independently an alkyl group of 1 to 6 carbon atoms, examples of which include methyl, ethyl, propyl, isopropyl, butyl, sec-butyl, tert-butyl, pentyl and hexyl groups. $R^1$ is most preferably a methyl group.

Each $R^2$ is independently $R^1$ or a hydrogen atom. $R^2$ is preferably a methyl group or a hydrogen atom.

In formula (1), n is an integer from 2 to 40, preferably an integer from 2 to 20, m is an integer from 0 to 98, preferably an integer from 8 to 60, and n+m is a number which satisfies the condition $5 \leq n+m \leq 100$, and preferably $10 \leq n+m \leq 80$. When n is less than 2, the composition does not fully cure; when it is larger than 40, unreacted SiH groups trigger excess crosslinking reactions, as a result of which the hardness of the cured product may rise. When n+m is less than 5, the physical properties of the silicone composition decrease; when n+m is larger than 100, the silicone composition has a poor extensibility.

The number of SiH groups on the molecule is preferably from 3 to 40, and more preferably from 4 to 20.

One such organohydrogenpolysiloxane may be used alone, or two or more may be used in admixture.

The amount of component (B) included per 100 parts by weight of component (A) is preferably from 0.1 to 20 parts by weight, and more preferably from 0.1 to 10 parts by weight.

Component (B) is included in an amount corresponding to from 0.5 to 3 moles, and preferably from 1 to 2 moles, of SiH groups per mole of silicon-bonded alkenyl groups in the composition. When there are too few SiH groups, the resulting composition does not fully cure; when there are too many, the unreacted Si groups trigger excess crosslinking reactions, increasing the hardness of the cured product.

Component (C)

Component (C) is a flaked graphite powder having an average thickness of 100 nm or less.

The average thickness of the graphite powder of component (C) is 100 m or less, and preferably 50 nm or less. By having the average thickness be 100 nm or less, the specific surface area of the graphite powder becomes larger. As a result, the thermal conductivity of the silicone composition can be increased with a small amount of addition. The average thickness of the graphite powder is preferably at least 0.5 mm, and more preferably at least 1 nm. In this invention, the average thickness of the graphite powder can be calculated from the specific surface area measured by the gas adsorption method and from image analysis with a scanning microscope (the same applies below).

The planar shape of component (c) may be any shape, such as a circular, elliptical or scaly shape. The average particle size in this planar direction is preferably in the range of 0.05 to 2,000 μm, and more preferably in the range of 5 to 2,000 μm. When the length (average particle diameter in the planar direction) is shorter than 0.05 μm, the thermal conductivity of the resulting composition decreases; when it is larger than 2,000 μm, the loading ability worsens, which also ends up lowering the thermal conductivity. In this invention, the average particle diameter in the planar direction of the graphite powder is the are base surface mean diameter obtained by image analysis with a scanning microscope (the same applies below).

The flaked graphite powder used in this invention may be a commercial product, examples of which include iGurafen-α and iGurafen-Σ from ITEC Co., Ltd.

Component (C) may be of one type used alone or two or more may be used in admixture.

Component (C) is included in an amount of from 1 to 50 parts by weight per 100 parts by weight of component (A). When the amount of component (C) is less than 1 part by weight, the thermal conductivity of the resulting composition is poor; when it exceeds 50 parts by weight, the resulting composition does not become grease-like.

Component (D)

Component (D) is a heat-conductive filler having a thermal conductivity of at least 10 W/m·° C.

The heat-conductive filler used as component (D) is one having a thermal conductivity of at least 10 W/m·° C., and preferably at least 15 W/m·° C. When the thermal conductivity of the filler is smaller than 10 W/m·° C., the thermal conductivity of the silicone composition itself ends up being smaller.

Illustrative examples of the heat-conductive filler include aluminum powder, copper powder, silver powder, iron powder, nickel powder, gold powder, tin powder, metallic silicon powder, aluminumnitride powder, boron nitride powder, alumina powder, diamond powder, indium powder, gallium powder and zinc oxide powder, Any heat-conductive filler may be used so long as it is one having a thermal conductivity of at least 10 W/m·° C. One type may be used alone or two or more types may be mixed together. The use of zinc oxide, aluminum powder, or a combination of these is preferred.

Component (D) has an average particle size that is preferably in the range of 0.1 to 100 μm, and more preferably in the range of 0.1 to 90 μm. When the average particle size is smaller than 0.1 μm, the resulting composition may not become grease-like and may have a poor extensibility; when the average particle size is larger than 100 μm, the resulting composition may have a larger thermal resistance and a reduced performance. In this invention, the average particle size is a volume base volume mean diameter that can be measured with the Microtrac MT-3300EX (Nikkiso Co., Ltd.).

Component (D) has a shape that may be amorphous, spherical or any other shape.

The loading of component (D) per 100 parts by weight of component (A) is from 100 to 4,000 parts by weight, preferably from 200 to 4,000 parts by weight, and more preferably from 400 to 4,000 parts by weight. At an amount of the heat-conductive filler below 100 parts by weight, the thermal conductivity of the resulting composition is poor; at more than 4,000 parts by weight, the resulting composition does not become grease-like.

Component (E)

Component (E) is a platinum group metal catalyst and functions to promote addition reactions. Hitherto known platinum group metal catalysts that are used in addition reactions may be used as the platinum group metal catalyst. Exemplary platinum group metal catalysts include platinum-based, palladium-based and rhodium-based catalysts. Of these, platinum and platinum compounds, which are relatively easily available, are preferred. Illustrative examples include uncombined platinum, platinum black, chloroplatinic acid, platinum-olefin complexes, platinum-alcohol complexes and platinum coordination compounds.

The platinum group metal catalyst may be of one type used alone or two or more types may be used in combination.

The component (E) content should be an amount that is effective as a catalyst; that is, the effective amount required to promote the addition reactions and cure the silicone composition of the invention. In terms of weight based on the platinum group metal atoms, the amount relative to component (A) is preferably from 0.1 to 500 ppm, and more preferably from 1 to 200 ppm. At an amount of catalyst below this lower limit, the effect as a catalyst may not be obtainable. On the other hand, an amount in excess of this upper limit is undesirable because it does not result in a further increase in the catalytic effects and is uneconomical.

Component (F)

The silicone composition of the invention may further include (F) a reaction regulator in order to keep the hydrosilylation reaction from proceeding at room temperature and thereby prolong the shelf life and the pot life. Hitherto known reaction regulators that are used in addition-curable silicone compositions may be used here as the reaction regulator (F). Examples include acetylene alcohols (e.g., ethynylmethydecylcarbinol, 1-ethynyl-1-cyclohexanol, 3,5-dimethyl-1-hexyn-3-ol and 1-cyclohexyl-2-propyn-1-ol), various nitrogen compounds such as tributylamine, tetramethylethylenediamine and benzotriazole, organophosphorus compounds such as triphenylphosphine, oxime compounds and organochlorine compounds.

When component (F) is included, the content thereof per 100 parts by weight of component (A) is preferably from 0.05 to 5 parts by weight, and more preferably from 0.1 to 2 parts by weight. When the amount of reaction regulator is less than 0.05 part by weight, the sufficient shelf life and pot life that are desired may not be obtainable; on the other hand, when it exceeds 5 parts by weight, the curability of the silicone composition may decrease.

To improve the dispersibility of the reaction regulator in the silicone composition, it may be used after dilution with an organo(poly)siloxane, toluene or the like.

Component (G)

Component (G) is a diluent. From the standpoints of safety and workability, use is made of a slightly volatile isoparaffin compound having a boiling point of between 160° C. and 360° C., preferably between 200° C. and 360° C., which can disperse or dissolve components (A) and (B).

At a boiling point below 160° C., even when used at room temperature, depending on the service environment, the diluent ends up evaporating. When use is made of a diluent that has a boiling point which is too high, such as greater than 360° C., too much ends up remaining behind in the heat-dissipating silicone grease consisting of the silicone composition, as a result of which the heat-dissipating properties decline.

Commercial products may be used as such isoparaffin compounds. Specific examples include IP Solvent MU2028 (Idemitsu Kosan Co., Ltd.; a mixture of isoparaffins with boiling points of 213 to 277° C.) and IP Solvent MU2835 (Idemitsu Kosan Co., Ltd.; a mixture of isoparaffins with boiling points of 277 to 353° C.).

When the amount of component (G) added is less than 0.1 wt % of the overall silicone composition, the viscosity of the silicone composition cannot be sufficiently lowered; when it is higher than 20 wt %, sedimentation of the filler speeds up, worsening the shelf stability of the silicone composition. Hence, the amount is preferably within the range of 0.1 to 20 wt %, and more preferably within the range of 0.1 to 10 wt %.

Component (H)

The silicone composition of the invention may further include (H) a hydrolyzable alkylpolysiloxane of general formula (2) below. By including component (H), the surface of the heat-conductive filler is treated, enabling effects such as a decrease in the viscosity of the composition and a rise in the heat conductivity to be obtained.

[Chem. 5]

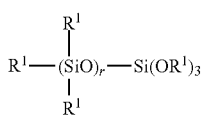

(2)

Here, $R^1$ is the same as above, and r is an integer from 5 to 100.

In formula (2), $R^1$ is the same as above, and is preferably a methyl group.

The subscript "r" is an integer from 5 to 100, and preferably an integer from 10 to 60. When the value of r is smaller than this lower limit value, bleeding from the resulting composition may occur and the reliability may worsen. When the value of r is larger than this upper limit value, wettability with the filler may be inadequate.

The amount of component (H) included is preferably from 1 to 400 parts by weight, and more preferably from 40 to 400 parts by weight, per 100 parts by weight of component (A). When the amount of component (H) is lower than this lower limit value, a sufficient wettability sometimes cannot be exhibited. On the other hand, when the amount of component (H) is higher than this upper limit value, bleeding from the resulting composition sometimes occurs.

Component (I)

For wettability with the heat-conductive filler and to impart the silicone composition with adhesive properties, it is preferable to include in the silicone composition of the invention a hydrolyzable organopolysiloxane of general formula (3) below

[Chem. 6]

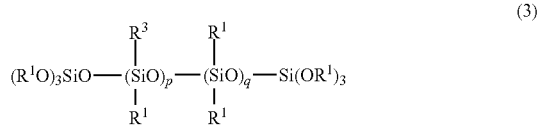
(3)

(wherein $R^1$ is the same as above, each $R^3$ is independently an alkenyl group of 2 to 6 carbon atoms, p is an integer from 1 to 20, q is an integer from 0 to 99, and p+q satisfies the condition 5≤p+q≤100).

In formula (3), $R^1$ is the same as above, and is preferably a methyl group.

$R^3$ is an alkenyl group of 2 to 6 carbon atoms, illustrative examples of which include vinyl, allyl, propenyl, isopropenyl, butenyl, hexenyl and cyclohexenyl groups. A vinyl group is preferred.

In formula (3), p is an integer from 1 to 20, preferably an integer from 1 to 5, q is an integer from 0 to 99, preferably an integer from 4 to 59, and p+q is a number which satisfies the condition 5≤p+q≤100, preferably 5≤p+q≤60. When p is less than 1, the resulting composition cannot obtain sufficient adhesive properties; when it is larger than 20, the hardness of the resulting composition after curing rises abruptly. When p+q is less than 5, bleeding may arise from the resulting composition; on the other hand, when p+q is larger than 100, the wettability with the filler may cease to be adequate.

Component (I) may be of one type used alone or two or more may be used in suitable combination.

The content of component (I) per 100 parts by weight of component (A) is preferably from 1 to 50 parts by weight, and more preferably from 1 to 20 parts by weight. When the component (I) content is below this lower limit, a sufficient wettability and adhesion may not be exhibited. On the other hand, when the component (I) content exceeds this upper limit, bleeding from the resulting composition may arise.

Component (J)

In addition, component (J) may be included in the silicone composition of the invention. This component is an organohydrogenpolysiloxane having at least one functional group selected from epoxy, (meth)acryloyl, (meth)acryloxy, alkoxysilyl, ether and carbonyl groups per molecule, and can impart adhesiveness to the silicone composition. This organohydrogenpolysiloxane is exemplified by compounds of general formula (5) below

[Chem. 7]

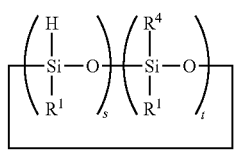
(5)

(wherein $R^1$ is the same as above; each $R^4$ is independently a group selected from epoxy, acryloyl, methacryloyl, carbonyl, ether and trialkoxysilyl groups that is bonded to a silicon atom through a carbon atom and/or an oxygen atom; s is an integer from 1 to 3; t is an integer from 1 to 8, preferably an integer from 1 to 3; and s+t is an integer from 3 to 9).

In formula (5), $R^1$ is the same as above, and is preferably a methyl group.

Each $R^4$ is independently a group selected from epoxy, acryloyl and methacryloyl groups, trialkoxysilyl and other alkoxysilyl groups, and ether and carbonyl groups, and has the effect of imparting adhesiveness to the silicone composition.

Specific examples of $R^4$ include those shown below

[Chem. 8]

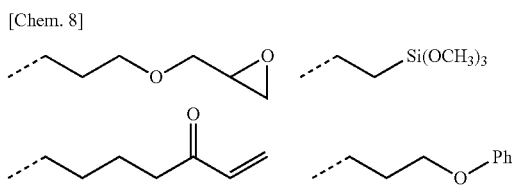

(wherein $R^1$ stands for a phenyl group and a dashed line represents a site available for bonding).

Examples of the organohydrogenpolysiloxane of formula (5) include those shown below.

[Chem. 9]

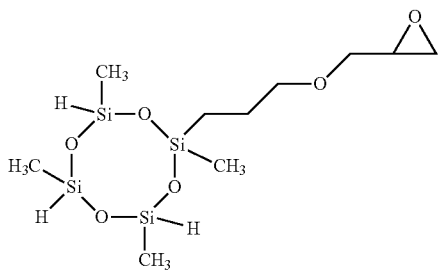

[Chem. 10]

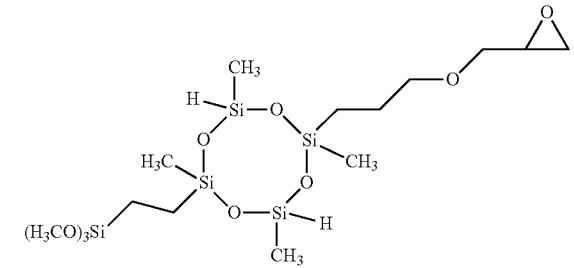

-continued

[Chem. 11]

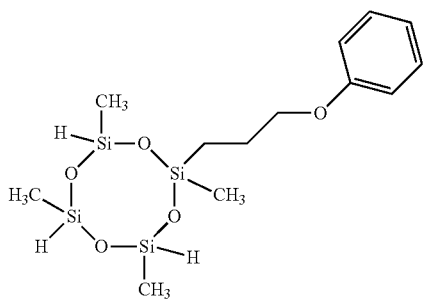

This organohydrogenpolysiloxane may be of one type used alone, or two or more may be used in admixture.

The total amount of the organohydrogenopolysiloxanes of components (B) and (J) relative to the overall silicone composition is preferably an amount such that the ratio (total number of SiH groups)/(total number of silicon-bonded aliphatic unsaturated hydrocarbon groups) is from 0.5 to 3, and more preferably an amount such that this ratio is from 1 to 2. Specifically, an amount such that the ratio (total number of SiH groups in components (B) and (J))/(total number of silicon-bonded aliphatic unsaturated hydrocarbon groups in components (A) and (I)) is from 0.5 to 3 is preferred, and an amount such that this ratio is from 1 to 2 is more preferred. When the amount of components (B) and (J) is less than 0.5, a sufficient adhesiveness may not be exhibited, and adherence to the substrate may worsen. On the other hand, when the amount is more than 3, unreacted SiH groups may give rise to excess crosslinking reactions and the hardness of the cured product may rise.

Also, the amount is preferably such that the ratio (number of SiH groups in component (J))/(total number of SiH groups in components (B) and (J)) is from 0.3 to 0.7. When the ratio (number of SiH groups in component (J))/(total number of SiH groups in components (B) and (J)) is less than 0.3, the physical properties of the silicone composition may decline; when this ratio is more than 0.7, a sufficient adhesiveness may not be exhibited and adherence to the substrate may worsen.

Component (K)

The silicone composition of the invention may additionally include component (K). Component (K) is an organic peroxide having a ten hour half-life temperature of at least 40° C. One type may be used alone or two or more may be used in suitable combination. Organic peroxides that may be used in this invention are not particularly limited, provided that they crosslink components (A) and (B) by way of radical reactions, and are exemplified by ketone peroxides, hydroperoxides, diacyl peroxides, dialkyl peroxides, peroxyketals, alkyl peresters and percarbonates.

Taking into account the temperature at which the silicone composition is to be heat cured and the shelf stability of the composition, this organic peroxide is one which has a ten hour half-life temperature of at least 40° C., preferably at least 50° C., more preferably at least 60° C., and even more preferably at least 65° C. When the ten hour half-life temperature is too low, it is difficult to fully ensure the shelf stability of the composition. There is no particular upper limit, although the ten hour half-life temperature is generally 200° C. or less.

When component (K) is included, the content thereof per 100 parts by weight of component (A) is preferably from 0.01 to 10 parts by weight, and more preferably from 0.5 to 5 parts by weight. At a content that is too low, the composition may not sufficiently cure; addition to a content that is too high does not improve the curability and is uneconomical.

Other Ingredients

The silicone composition of the invention may further include an organo(poly)siloxane that does not have reactivity with methylpolysiloxane, etc. in order to adjust the elastic modulus and viscosity of the composition. In addition, to prevent deterioration of the silicone composition, an antioxidant known to the art, such as 2,6-di-t-butyl-4-methylphenol, may be optionally included. Also, dyes, pigments, flame retardants, sedimentation inhibitors, thixotropy modifiers and the like may be optionally included.

Next, the method for producing the silicone composition of the invention is described, although the invention is not limited thereby.

Production of Silicone Composition

The method for producing the silicone composition of the invention is not particularly limited, so long as it accords with methods for producing conventional silicone compositions. For example, production may be carried out by a method that mixes together components (A) to (G) and also, where necessary, other ingredients using a mixer such as the Trimix, Twinmix or Planetary Mixer (all registered trademarks of mixers manufactured by Inoue Mfg, Inc.), the Ultra Mixer (registered trademark of mixers manufactured by Mizuho Industrial Co., Ltd.) or the HIVIS DISPER MIX (registered trademark of mixers manufactured by Tokushu Kika Kogyo KK).

The silicone composition of the invention has an absolute viscosity measured at 25° C. which is preferably from 3.0 to 500 Pa·s, and more preferably from 10 to 400 Pa·s. At an absolute viscosity below 3.0 Pa·s, shape retention may become difficult and the workability may worsen in other respects as well. In cases too where the absolute viscosity exceeds 500 Pa·s, discharge may become difficult and the workability may worsen in other respects as well. This absolute viscosity can be obtained by adjustments in the compounding of the ingredients. In this invention, the absolute viscosity is the value measured at 25° C. with a spiral viscometer, such as the PC-IT spiral viscometer from Malcolm Co., Ltd. (10 rpm with rotor A; shear rate, 6 s$^{-1}$).

The silicone composition of the invention may be placed between an electronic component (e.g., a LSI chip) or other heat-generating member and a cooling member, and favorably used for heat dissipation by conducting heat from the heat-generating member to the cooling member. It can be used in the same way as conventional heat-conductive silicone greases. For example, the silicone composition of the invention can be cured by heat generated from a heat-generating member such as an electronic component. Alternatively, the silicone composition of the invention may be applied and then deliberately heat-cured. A semiconductor device in which the cured form of the inventive silicone composition has been interposed between a heat-generating member and a cooling member can thus be provided. The curing conditions when heat-curing the silicone composition of the invention, although not particularly limited, are typically between 80 and 200° C., preferably between 100 and 180° C., and from 30 minutes to 4 hours, preferably from 30 minutes to 2 hours.

Because the silicone composition of the invention has a high thermal conductivity and a good handleability, it is especially well-suited for use as a heat-dissipating grease for sophisticated semiconductor devices.

EXAMPLES

The invention is illustrated more fully below by way of Examples and Comparative Examples, although the invention is not limited by these Examples. The kinematic viscosities mentioned below are values measured at 25° C. with an Ubbelohde-type Ostwald viscometer (Sibata Scientific Technology Ltd.).

Component (A)

A-1: Dimethylpolysiloxane capped at both ends with dimethylvinylsiloxy groups and having a kinematic viscosity at 25° C. of 600 mm²/s A-2: Dimethylpolysiloxane capped at both ends with dimethylvinylsiloxy groups and having a kinematic viscosity at 25° C. of 30,000 mm²/s Component (B)

B-1: An organohydrogenpolysiloxane of the following formula

[Chem. 12]

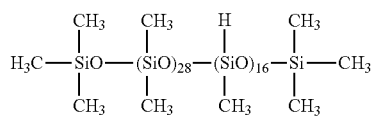

B-2: An organohydrogenpolysiloxane of the following formula

[Chem. 13]

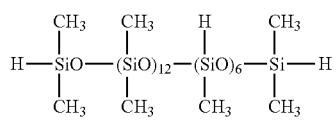

B-3: An organohydrogenpolysiloxane of the following formula

[Chem. 14]

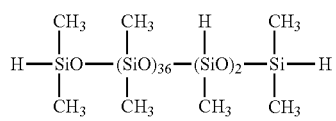

Component (C)

C-1: A graphite powder obtained by premixing, in a 50:50 weight ratio, a flaked graphite powder having an average thickness of 30 nm and an average particle size in the planar direction of 380 μm with a flaked graphite powder having an average thickness of 30 nm and an average particle size in the planar direction of 900 μm C-2: A graphite powder obtained by premixing, in a 50:50 weight ratio, a flaked graphite powder having an average thickness of 30 nm and an average particle size in the planar direction of 380 μm with a flaked graphite powder having an average thickness of 30 nm and an average particle size in the planar direction of 1,800 μm C-3: A flaked graphite powder having an average thickness of 10.0 mm and an average particle size in the planar direction of 5 μm C4: A spherical graphite powder having an average particle size of 35.0 nm Component (D)

D-1: An aluminum powder obtained by premixing an aluminum powder having an average particle size of 10.0 μm with an aluminum powder having an average particle size of 2.0 μm in a 60:40 weight ratio (thermal conductivity, 237 W/(m·° C.))

D-2: An aluminum powder obtained by premixing an aluminum powder having an average particle size of 20.0 μm with an aluminum powder having an average particle size of 2.0 μm in a 60:40 weight ratio (thermal conductivity, 237 W/(m·° C.))

D-3: A zinc oxide powder having an average particle size of 1.0 μm (thermal conductivity, 25 W/(m·° C.))

Component (E)

E-1: A solution obtained by dissolving a platinum-divinyltetramethyldisiloxane complex in the same dimethylpolysiloxane as A-1 above (platinum atom content, 1 wt %)

Component (F)

F-1: The compound of the following formula

[Chem. 15]

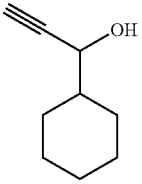

Component (G)

G-1: IP Solvent MU2028 (Idemitsu Kosan Co., Ltd.; a mixture of isoparaffins having a boiling point of 213 to 277° C.)

Component (H)

H-1: A dimethylpolysiloxane having a trimethoxysilyl group on one end, of the following formula

[Chem. 16]

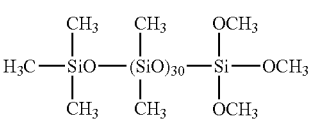

Component (I)

I-1: A polysiloxane of the following formula

[Chem. 17]

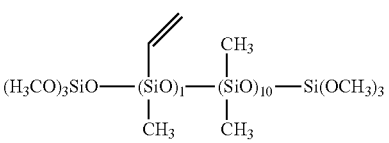

Component (J)

J-1: An organohydrogenpolysiloxane of the following formula

[Chem. 18]

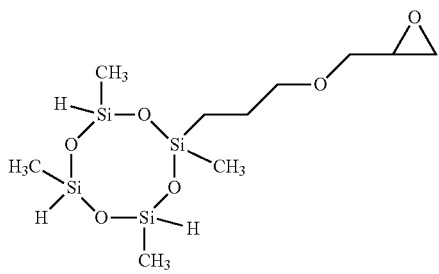

J-2: An organohydrogenpolysiloxane of the following formula

[Chem. 19]

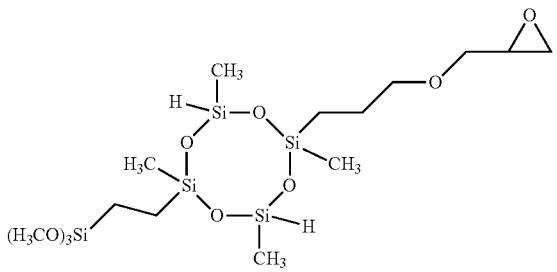

Component (K)

K-1: The dialkyl peroxide of the following formula (available as Kayahexa AD from Kayaku Akzo Corporation; ten hour half-life temperature, 118° C.)

[Chem. 20]

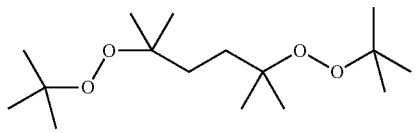

K-2: The diacyl peroxide of the following formula (available as Perkadox PM-50S-PS from Kayaku Akzo Corporation; ten hour half-life temperature, 71° C.)

[Chem. 21]

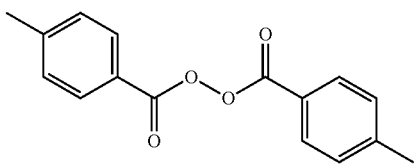

Examples 1 to 20, Comparative Examples 1 to 5

<Preparation of Silicone Composition>

Silicone compositions were prepared by using the following method to blend together components (A) to (K) in the amounts shown in Tables 1 to 4 below. In Table 1, the weight of component (E) is the weight of the solution obtained by dissolving a platinum-divinyltetramethyldisiloxane complex in dimethylpolysiloxane (platinum atom content, 1 wt %). SiH/SiVi is the ratio of the total number of SiH groups in components (B) and (J) to the total number of alkenyl groups in components (A) and (I).

Components (A), (C), (D), (H) and (I) were added to a 5-liter planetary mixer (Inoue Mfg., Inc.) and mixed at 170° C. for one and half hours. The mixture was then cooled to room temperature, following which components (B). (E), (F), (G), (J) and (K) were added and mixing was carried out to uniformity, thereby giving the silicone composition.

The viscosity, thermal conductivity and bond strength for each of the compositions obtained as described above were measured by the following methods. The results are presented in Tables 1 to 4.

[Absolute Viscosity]

The absolute viscosity of the silicone composition was measured at 25° C. using the PC-1T spiral viscometer from Malcolm Co., Ltd.

[Thermal Conductivity]

Each composition was cured for one hour in a 150° C. oven, and the thermal conductivity of the sheet that formed was measured with the TPA-501 from Kyoto Electronics Manufacturing Co., Ltd.

[Bond Strength]

Each composition was sandwiched between a 1 mm×1 mm silicon wafer and a nickel plate, and was heated at 150° C. for 60 minutes while applying pressure with 1.8 kgf grips. The bond strength was then measured using the Dage series 4000 PXY bondtester (Dage Deutschland GmbH).

TABLE 1

| | | Example | | | | | | | |
|---|---|---|---|---|---|---|---|---|---|
| | | 1 | 2 | 3 | 4 | 5 | 6 | 7 | 8 |
| Formulation (pbw) | A-1 | 100 | 100 | 100 | 0 | 100 | 100 | 100 | 100 |
| | A-2 | 0 | 0 | 0 | 100 | 0 | 0 | 0 | 0 |
| | B-1 | 2.8 | 2.8 | 2.8 | 1.4 | 5.6 | 5.6 | 1.4 | 2.8 |
| | B-2 | 0 | 0 | 0 | 0 | 0 | 0 | 0 | 0 |
| | B-3 | 0 | 0 | 0 | 0 | 0 | 0 | 0 | 0 |
| | C-1 | 10 | 0 | 0 | 10 | 10 | 20 | 20 | 20 |
| | C-2 | 0 | 10 | 0 | 0 | 0 | 0 | 0 | 0 |
| | C-3 | 0 | 0 | 10 | 0 | 0 | 0 | 0 | 0 |
| | C-4 | 0 | 0 | 0 | 0 | 0 | 0 | 0 | 0 |
| | D-1 | 2,000 | 2,000 | 2,000 | 2,000 | 2,000 | 2,000 | 2,000 | 2,000 |

TABLE 1-continued

|  |  | Example | | | | | | | |
|---|---|---|---|---|---|---|---|---|---|
|  |  | 1 | 2 | 3 | 4 | 5 | 6 | 7 | 8 |
|  | D-2 | 0 | 0 | 0 | 0 | 0 | 0 | 0 | 0 |
|  | D-3 | 492 | 492 | 492 | 492 | 492 | 492 | 492 | 492 |
|  | Total amount of filler | 2,492 | 2,492 | 2,492 | 2,492 | 2,492 | 2,492 | 2,492 | 2,492 |
|  | E-1 | 0.8 | 0.8 | 0.8 | 0.8 | 0.8 | 0.8 | 0.8 | 0.8 |
|  | F-1 | 0.2 | 0.2 | 0.2 | 0.2 | 0.4 | 0.4 | 04 | 0.4 |
|  | G-1 | 35 | 35 | 35 | 35 | 35 | 35 | 35 | 24 |
|  | H-1 | 100 | 100 | 100 | 100 | 100 | 100 | 100 | 100 |
|  | I-1 | 0 | 0 | 0 | 0 | 0 | 0 | 0 | 0 |
|  | J-1 | 0 | 0 | 0 | 0 | 0 | 0 | 0.9 | 1.8 |
|  | J-2 | 0 | 0 | 0 | 0 | 0 | 0 | 0 | 0 |
|  | K-1 | 0 | 0 | 0 | 0 | 0 | 0 | 0 | 0 |
|  | K-2 | 0 | 0 | 0 | 0 | 0 | 0 | 0 | 0 |
|  | SiH/SiVi | 1 | 1 | 1 | 1 | 2 | 2 | 1 | 2 |
| Evaluation results | Absolute viscosity (Pa · s) | 129 | 138 | 85 | 204 | 125 | 240 | 151 | 320 |
|  | Thermal conductivity (W/(m · °C.)) | 6.7 | 6.5 | 5..5 | 6 | 2. | 7.5 | 6.8 | 7.5 |
|  | Bond strength (MPa) | 0.1 | 0.1 | 0.1 | 0.1 | 0.1 | 0.1 | 0.2 | 0.4 |

TABLE 2

|  |  | Example | | | | | | | |
|---|---|---|---|---|---|---|---|---|---|
|  |  | 9 | 10 | 11 | 12 | 13 | 14 | 15 | 16 |
| Formulation (pbw) | A-1 | 100 | 100 | 100 | 100 | 100 | 100 | 100 | 100 |
|  | A-2 | 0 | 0 | 0 | 0 | 0 | 0 | 0 | 0 |
|  | B-1 | 2.8 | 2.8 | 0 | 0 | 2.8 | 2.8 | 0 | 0 |
|  | B-2 | 0 | 0 | 2.8 | 0 | 0 | 0 | 6.2 | 6.2 |
|  | B-3 | 0 | 0 | 0 | 10 | 0 | 0 | 0 | 0 |
|  | C-1 | 50 | 20 | 20 | 20 | 20 | 20 | 17 | 17 |
|  | C-2 | 0 | 0 | 0 | 0 | 0 | 0 | 0 | 0 |
|  | C-3 | 0 | 0 | 0 | 0 | 0 | 0 | 0 | 0 |
|  | C-4 | 0 | 0 | 0 | 0 | 0 | 0 | 0 | 0 |
|  | D-1 | 2,000 | 2,000 | 2,000 | 2,000 | 0 | 0 | 0 | 0 |
|  | D-2 | 0 | 0 | 0 | 0 | 2,000 | 1,820 | 1,820 | 1,820 |
|  | D-3 | 492 | 492 | 492 | 492 | 492 | 492 | 492 | 492 |
|  | Total amount of filler | 2,492 | 2,492 | 2,492 | 2,492 | 2,492 | 2,312 | 2,312 | 2,312 |
|  | E-1 | 0.8 | 0.8 | 0.8 | 0.8 | 0.8 | 0.8 | 0.8 | 0.8 |
|  | F-1 | 0.4 | 0.4 | 0.4 | 0.4 | 0.4 | 0.4 | 0.4 | 0.4 |
|  | G-1 | 24 | 40 | 40 | 40 | 40 | 28 | 16 | 40 |
|  | H-1 | 400 | 100 | 100 | 100 | 100 | 80 | 80 | 80 |
|  | I-1 | 0 | 0 | 0 | 0 | 0 | 0 | 17 | 17 |
|  | J-1 | 1.8 | 1.8 | 1.8 | 1.8 | 1.8 | 1.8 | 4 | 4 |
|  | J-2 | 0 | 0 | 0 | 0 | 0 | 0 | 0 | 0 |
|  | K-1 | 0 | 0 | 0 | 0 | 0 | 2 | 2 | 2 |
|  | K-2 | 0 | 0 | 0 | 0 | 0 | 0 | 0 | 0 |
|  | SiH/SiVi | 2 | 2 | 2 | 2 | 2 | 2 | 2 | 2 |
| Evaluation results | Absolute viscosity (Pa · s) | 230 | 155 | 161 | 170 | 168 | 124 | 209 | 134 |
|  | Thermal conductivity (W/(m · °C.)) | 7.3 | 6.8 | 7 | 6.2 | 7.8 | 7.2 | 6.3 | 6.6 |
|  | Bond strength (MPa) | 0.1 | 0.6 | 0.8 | 0.3 | 0.7 | 0.5 | 2 | 1.5 |

TABLE 3

|  |  | Example | | | | | | Example | | | |
|---|---|---|---|---|---|---|---|---|---|---|---|
|  |  | 17 | 18 | 19 | 20 |  |  | 17 | 18 | 19 | 20 |
| Formulation (phw) | A-1 | 100 | 100 | 100 | 100 |  | D-1 | 0 | 0 | 0 | 0 |
|  | A-2 | 0 | 0 | 0 | 0 |  | D-2 | 1,820 | 1,820 | 3,140 | 300 |
|  | B-1 | 0 | 0 | 5.6 | 5.6 |  | D-3 | 492 | 492 | 811 | 100 |
|  | B-2 | 6.2 | 6.2 | 0 | 0 |  | Total amount of filler | 2,312 | 2,312 | 3,951 | 400 |
|  | B-3 | 0 | 0 | 0 | 0 |  | E-1 | 0.8 | 0.8 | 0.8 | 0.8 |
|  | C-1 | 17 | 17 | 1 | 50 |  | F-1 | 0.4 | 0.4 | 0.2 | 0.2 |
|  | C-2 | 0 | 0 | 0 | 0 |  | G-1 | 40 | 16 | 40 | 40 |
|  | C-3 | 0 | 0 | 0 | 0 |  | H-1 | 80 | 80 | 300 | 0 |
|  | C-4 | 0 | 0 | 0 | 0 |  |  |  |  |  |  |

TABLE 3-continued

|  |  | Example | | | |
|---|---|---|---|---|---|
|  |  | 17 | 18 | 19 | 20 |
| | I-1 | 8.5 | 8.5 | 0 | 0 |
| | J-1 | 0 | 4 | 0 | 0 |
| | J-2 | 7.5 | 0 | 0 | 0 |
| | K-1 | 2 | 0 | 0 | 0 |
| | K-2 | 0 | 4 | 0 | 0 |
| | SiH/SiVi | 2 | 2 | 2 | 2 |
| Evaluation results | Absolute viscosity (Pa · s) | 131 | 132 | 187 | 178 |
| | Thermal conductivity (W/(m · °C.)) | 6.3 | 6.6 | 7 | 7 |
| | Bond strength (MPa) | 1.6 | 1.5 | 0.1 | 0.1 |

TABLE 4

|  |  | Comparative Example | | | | |
|---|---|---|---|---|---|---|
|  |  | 1 | 2 | 3 | 4 | 5 |
| Formulation (pbw) | A-1 | 100 | 100 | 100 | 100 | 100 |
| | A-2 | 0 | 0 | 0 | 0 | 0 |
| | B-1 | 2.8 | 2.8 | 2.8 | 2.8 | 2.8 |
| | B-2 | 0 | 0 | 0 | 0 | 0 |
| | B-3 | 0 | 0 | 0 | 0 | 0 |
| | C-1 | 0 | 0 | 10 | 60 | 10 |
| | C-2 | 0 | 0 | 0 | 0 | 0 |
| | C-3 | 0 | 0 | 0 | 0 | 0 |
| | C-4 | 0 | 10 | 0 | 0 | 0 |
| | D-1 | 2000, | 2,000 | 2,000 | 2,000 | 4,000 |
| | D-2 | 0 | 0 | 0 | 0 | 0 |
| | D-3 | 492 | 492 | 492 | 492 | 984 |
| | Total amount of filler | 2,492 | 2,492 | 2,492 | 2,492 | 4,984 |
| | E-1 | 0.8 | 0.8 | 0.8 | 0.8 | 0.8 |
| | F-1 | 0.2 | 0.2 | 0.2 | 0.2 | 0.4 |
| | G-1 | 0 | 0 | 0 | 40 | 40 |
| | H-1 | 100 | 100 | 100 | 100 | 100 |
| | I-1 | 0 | 0 | 0 | 0 | 0 |
| | J-1 | 0 | 0 | 0 | 0 | 0 |
| | J-2 | 0 | 0 | 0 | 0 | 0 |
| | K-1 | 0 | 0 | 0 | 0 | 0 |
| | K-2 | 0 | 0 | 0 | 0 | 0 |
| | SiH/SiVi | 1 | 1 | 1 | 1 | 1 |
| Evaluation results | Absolute viscosity (Pa · s) | 230 | 289 | 685 | did not become grease-like | did not become grease-like |
| | Thermal conductivity (W/(m · °C.)) | 5 | 5 | 7 | | |
| | Bond strength (MPa) | 0.1 | 0.1 | 0.1 | | |

It is apparent from the results in Tables 1 to 4 that, in Examples 1 to 20 which satisfy the conditions of the invention, in contrast with Comparative Examples 1 to 5, the thermal conductivity of the silicone composition was large.

On the other hand, both in Comparative Example 1 which did not include component (C) and in Comparative Example 2 in which unflaked component C-4 was used as component (C), the thermal conductivity decreased. In Comparative Example 3 which did not include component (G), the viscosity was high and the workability decreased. Both in Comparative Example 4 which included 60 parts by weight of component (C), an amount that was higher than the range for this invention, and also in Comparative Example 5 wherein the total amount of component (D) was 4,984 parts by weight, which was higher than the range for this invention, the compositions did not become grease-like.

Accordingly, although the silicone compositions of the invention contained large amounts of heat-conductive filler, they were found to provide silicone greases which had a good handleability and exhibited an excellent thermal performance after setting.

The invention claimed is:

1. A silicone composition comprising:
   (A) 100 parts by weight of an organopolysiloxane having at least two aliphatic unsaturated hydrocarbon groups per molecule and a kinematic viscosity at 25° C. of from 60 to 100,000 $mm^{2/s}$,
   (B) an organohydrogenpolysiloxane of general formula (1) below in an amount corresponding to 0.5 to 3 moles of silicon-bonded hydrogen atoms per mole of silicon-bonded alkenyl groups in the composition

[Chem. 1]

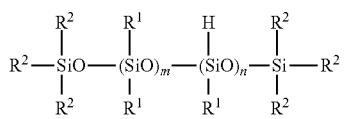

(1)

(wherein each $R^1$ is independently an alkyl group of 1 to 6 carbon atoms, each $R^2$ is independently $R^1$ or a hydrogen atom, n is an integer from 2 to 40, m is an integer from 0 to 98, and n+m satisfies the condition $5 \leq n+m \leq 100$).

(C) from 1 to 50 parts by weight of flaked graphite powder having an average thickness of 100 nm or less, (D) from 100 to 4.000 parts by weight of a heat-conductive filler having a thermal conductivity of at least 10 W/m·° C., (E) an effective amount of a platinum group metal catalyst, and (G) from 0.1 to 20 wt %, based on the overall silicone composition, of a slightly volatile isoparaffin compound having a boiling point of between 160° C. and 360° C. that can disperse or dissolve components (A) and (B).

2. The silicone composition of claim I, further comprising (F) a reaction regulator in an amount of from 0.05 to 5 parts by weight per 100 parts by weight of component (A).

3. The silicone composition of claim 1, further comprising (H) a hydrolyzable alkylpolysiloxane of general formula (2) below

[Chem. 2]

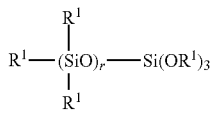

(2)

(wherein each $R^1$ is independently an alkyl group of 1 to 6 carbon atoms, and r is an integer from 5 to 100), in an amount of from 1 to 400 parts by weight per 100 parts by weight of component (A).

4. The silicone composition of claim 1, further comprising (I) a hydrolyzable organopolysiloxane of general formula (3) below

[Chem. 3]

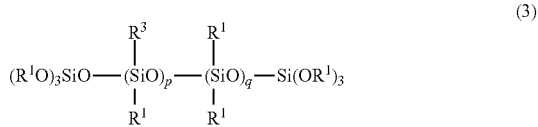

(3)

(wherein each $R^1$ is independently an alkyl group of 1 to 6 carbon atoms, each $R^3$ is independently an alkenyl group of 2 to 6 carbon atoms, p is an integer from 1 to 20, q is an integer from 0 to 99, and p+q satisfies the condition $5 \leq p+q \leq 100$), in an amount of from 1 to 50 parts by weight per 100 parts by weight of component (A).

5. The silicone composition of claim 1, further comprising (J) organohydrogenpolysiloxane having at least one functional group selected from epoxy, (meth)acryloyl, (meth)acryloxy, alkoxysilyl, ether and carbonyl groups per molecule, in an amount corresponding to from 0.5 to 3 moles of silicon-bonded hydrogen atoms per mole of silicon-bonded alkenyl groups in the composition.

6. The silicone composition of claim 1, further comprising (K) an organic peroxide having a ten hour half-life temperature of at least 40° C., in an amount of from 0.01 to 10 parts by weight per 100 parts by weight of component (A).

* * * * *